United States Patent Office 2,841,603
Patented July 1, 1958

2,841,603
LIQUID PHASE OXIDATION OF PARAFFINIC HYDROCARBON MIXTURES

Carl N. Zellner, Berkeley Heights, and Fred Lister, Cranford, N. J., assignors to Tidewater Oil Company, a corporation of Delaware No Drawing. Application March 8, 1955
Serial No. 493,074

7 Claims. (Cl. 260—451)

The present invention relates to a process for controlled oxidation of hydrocarbons and, particularly, to liquid phase partial oxidation of relatively high molecular weight predominantly paraffinic hydrocarbon mixtures with the use of an improved oxidation catalyst.

In the reaction of hydrocarbon mixtures with oxygen of a free oxygen-containing gas under oxidizing conditions for partial oxidation of the mixtures, crude oxidized hydrocarbon mixtures are obtained that comprise a wide variety of oxidized products, the nature of which appears to be primarily dependent upon the particular conditions employed for effecting the oxidation. For example, the art contains numerous disclosures relating to partial oxidation of suitable hydrocarbon mixtures for preparation of acidic oxidized mixtures that possess relatively low saponification values and contain a substantial amount of monobasic acids with a negligible amount, if any, of substances such as crystalline polybasic acids. The art is also aware of processes for preparation of acidic oxidized hydrocarbon mixtures that possess relatively high saponification values (e. g. at least about 400 mgs. of KOH per gram, and higher) and contain a substantial amount of polyfunctional acidic substances, including crystalline dibasic acids. In illustration thereof, reference is made to U. S. Patent No. 2,486,454 disclosing a process for controlled oxidation of suitable hydrocarbon mixtures in liquid phase by reaction thereof with oxygen of a free oxygen-containing gas for preparation of crude oxidized hydrocarbon mixtures that have a saponification value of at least 400, a substantial difference between acid and saponification values, and contain a substantial amount of polybasic acidic substances, including crystalline dibasic acids.

In the oxidation of hydrocarbons as aforesaid, it is desirable (1) that the oxidation reaction be carried out to a given saponification value in as short a time as possible, (2) that the oxidation product be colorless or as nearly colorless as possible, and (3) that the oxidation product have a high ratio of acid to saponification number. A low color value is desirable as it facilitates preparation of colorless, or substantially colorless, derivatives such as esters of the acids in the oxidized mixture; an accelerated rate of reaction is desirable as it enables more efficient utilization of equipment used for the oxidation reaction, and an oxidation product as embodied herein having a relatively high ratio of acid to saponification value is desirable as such products generally contain a relatively high amount of desirable polyfunctional materials.

The art is also aware of numerous materials that function as oxidation catalysts for carrying out partial oxidation reactions as aforediscussed with specific catalysts being metals such as cobalt, manganese, and others, preferably in the form of compounds thereof, that are soluble in the hydrocarbons subjected to oxidation. Of such catalytic materials, manganese is particularly suitable in that oxidation reactions therewith can be carried out to relatively high saponification values at relatively fast rates of reaction. For certain oxidations, such as in oxidation of relatively low molecular weight hydrocarbons, manganese salts of low molecular weight acids are usually preferred due to their solubility characteristics in such hydrocarbons, whereas; for liquid phase oxidation of relatively high molecular weight hydrocarbon mixtures, such as gas oils to paraffin waxes, manganese salts of relatively high molecular weight acids such as the higher fatty acids, naphthenic acids, and the like, are generally preferred. Although manganese is, in general, suitable for oxidation of relatively high molecular weight hydrocarbon mixtures, a desideratum is the obtainment of a catalyst material that will accelerate the rate of oxidation to a given saponification value, and provide oxidation mixtures of suitable color and acid to saponification ratio. The primary object of the present invention is to provide a catalyst for use in carrying out oxidation reactions as aforedescribed with obtainment of such improved results.

The present invention is based on the discovery that liquid phase oxidation, with oxygen of a free oxygen-containing gas, of relatively high molecular weight hydrocarbon mixtures can be accelerated by use of an oxidation catalyst comprising manganese and a metal in group IVB of the periodic table. In addition to accelerating the rate of the oxidation reaction, use of the combination catalyst as embodied herein generally provides, for oxidation to comparable saponification values, oxidation products that are lower in color value and/or of higher ratio of acid to saponification value than oxidation products obtained with the manganese catalysts per se.

In order to illustrate the invention in specific embodiments thereof, several tables are set forth hereinafter. The tabulated data is from oxidations made in accordance with the process described and claimed in U. S. Patent No. 2,486,454. In Tables I to IV, inclusive, the data pertain to results obtained from liquid phase oxidation of a paraffin wax (120° F., melting point) at 150° C. and an oxygen input rate of 6.0 liters per minute per kilogram of hydrocarbon charge. Properties of the wax used are as follows:

MANUFACTURED FROM A MIXTURE OF EAST TEXAS CRUDE AND PENNSYLVANIA CRUDE BY SWEATING

Viscosity @ 210° F_____ 36.0
Penetration 100g./77°/5 secs_____ 36
Oil content (wt. percent)_____ 1.0
Tensile strength_____ 22
Color (Saybolt)_____ 21

Table I consists of such oxidations in which the catalyst consisted of a manganese catalyst per se or a group IVB metal catalyst per se, illustrated by zirconium, and the data clearly illustrate the improved results obtained, as to rate of reaction and acid: saponification ratio of the oxidation product, by use of a manganese catalyst per se as compared to the zirconium catalysts. With reference to the catalyst designated "zirconium complex" in Tables I, II, III and IV, said catalyst consisted of a zirconium complex salt of ethylene diamine tetraacetic acid.

Table I

| Run No. | Catalyst | Percent catalyst (by weight of charge) | Gram atoms of metal in catalyst per kilogram of charge | Saponification value—milligrams KOH/g. | | | | Final ratio, acid/sap. | Color, ASTM scale |
|---|---|---|---|---|---|---|---|---|---|
| | | | | 3 hrs. | 4½ hrs. | 6 hrs. | 7½ hrs. | | |
| 1 | Manganese naphthenate (8% Mn) | 1.0 | 0.0146 | 325 | 414 | 543 | 594 | 0.63 | 3½ |
| 2 | do | 0.5 | 0.0073 | 280 | 364 | 426 | 454 | 0.60 | 3¼ |
| 3 | do | 0.25 | 0.0037 | 275 | 364 | 431 | 454 | 0.60 | 2¾ |
| 4 | Zirconium complex (6% Zr) | 1.5 | 0.0099 | 185 | 314 | 386 | 435 | 0.58 | 3¼ |
| 5 | Zirconium naphthenate (8% Zr) | 1.5 | 0.0134 | | 308 | 370 | 414 | 0.56 | 4 |

Table II, set forth hereinafter, illustrates embodiments of the invention using catalyst combinations of manganese and a group IVB metal, specifically thorium, titanium and zirconium. For purposes of comparison, Table II contains data for run No. 1 in which manganese naphthenate per se was used as the catalyst. As shown for run Nos. 6–9, inclusive, markedly higher saponification values were obtained by use of a combination catalyst as embodied herein, as compared to the results obtained with the manganese catalyst per se, thereby evidencing the accelerated rate of oxidation obtainable by practice of the invention described herein.

In Tables III and IV, set forth hereinafter, data are presented illustrating additional embodiments of the invention with (1) catalyst concentrations different than employed in the runs for which data are presented in Table II, and (2) use of still another group IVB metal, hafnium. The marked improvement obtained by practice of the invention is clearly illustrated, particularly by comparison of the data for run Nos. 10 and 3 in Table III and Nos. 12 and 1 in Table IV as use of the combination catalyst produced a product of (1) higher saponification value, and (2) higher acid to saponification ratio after comparable times of reaction than were obtained in a corresponding run with the manganese catalyst per se. That such improvements over manganese per se results by use of a group IVB metal catalyst in combination with manganese is clearly unexpected, especially in view of the aforeshown inferiority of zirconium per se as compared to manganese in catalyzing the oxidation reaction.

Table II

| Run No. | Catalyst | Percent catalyst (by weight of charge) | Gram atoms of metal in catalyst per kilogram of charge | Saponification value—milligrams KOH/g. | | | | Ratio, gram atoms Mn: Group IVB metal in catalyst |
|---|---|---|---|---|---|---|---|---|
| | | | | 3 hrs. | 4½ hrs. | 6 hrs. | 7½ hrs. | |
| 1 | Manganese naphthenate (8% Mn) | 1.0 | 0.0146 | 325 | 414 | 543 | 594 | |
| 6 | Manganese naphthenate (8% Mn) / Zirconium naphthenate (8% Zr) | 1.74 | 0.0073 / 0.0109 / 0.0172 | 353 | 500 | 582 | | 1:1.5 |
| 7 | Manganese naphthenate (8% Mn) / Thorium naphthenate (21.25% Th) | 1.7 | 0.0073 / 0.0109 / 0.0172 | 363 | 510 | 600 | | 1:1.5 |
| 8 | Manganese naphthenate (8% Mn) / Titanium naphthenate (3% Ti) | 2.5 | 0.0073 / 0.0125 / 0.0198 | 365 | 506 | 588 | | 1:1.7 |
| 9 | Manganese naphthenate (8% Mn) / Zirconium complex (6% Zr) | 1.5 | 0.0073 / 0.0066 / 0.0139 | 366 | 510 | 620 | 682 | 1:0.9 |

Table III

| Run No. | Catalyst | Percent catalyst (by weight of charge) | Gram atoms of metal in catalyst per kilogram of charge | Saponification value—milligrams KOH/g. | | | Final ratio, acid/sap. | Color, ASTM scale | Ratio, gram atoms Mn:Group IVB metal in catalyst |
|---|---|---|---|---|---|---|---|---|---|
| | | | | 4½ hrs. | 6 hrs. | 7½ hrs. | | | |
| 3 | Manganese naphthenate (8% Mn) | 0.25 | 0.0037 | 364 | 431 | 454 | 0.60 | 2¾ | |
| 10 | Manganese naphthenate (8% Mn) / Hafnium naphthenate (6.7% Hf) | 1.0 | 0.00182 / 0.00273 / 0.00455 | 387 | 488 | 599 | 0.65 | 3 | 1:1.5 |
| 11 | Manganese naphthenate (8% Mn) / Zirconium complex (8% Zr) | 0.38 | 0.00182 / 0.00165 / 0.00347 | 460 | 566 | | 0.63 | 2¾ | 1:0.9 |

Table IV

| Run No. | Catalyst | Percent catalyst (by weight of charge) | Gram atoms of metal in catalyst per kilogram of charge | Saponification value—Milligrams KOH/g. | | | | Final ratio, acid/sap. | Color, ASTM scale | Ratio, gram atoms Mn:Group IVB metal in catalyst |
|---|---|---|---|---|---|---|---|---|---|---|
| | | | | 3 hrs. | 4¾ hrs. | 6 hrs. | 7¾ hrs. | | | |
| 1 | Manganese naphthenate (8% Mn) | 1.0 | 0.0146 | 325 | 414 | 543 | 594 | 0.63 | 3½ | |
| 12 | Manganese naphthenate (8% Mn) / Zirconium naphthenate (8% Zr) | 1.2 | 0.0120 / 0.0032 / 0.0152 | 338 | 533 | 650 | | 0.66 | 1½ | 1:0.27 |
| 13 | Manganese naphthenate (8% Mn) / Zirconium naphthenate (8% Zr) | 1.26 | 0.0073 / 0.0067 / 0.0130 | 386 | 533 | 650 | | 0.66 | 1½ | 1:0.9 |

Regarding hydrocarbon charge stocks for carrying out oxidation reactions as embodied herein, stocks that are predominantly paraffinic are preferred. As aforesaid, the invention contemplates oxidation of relatively high molecular weight hydrocarbon materials, such, for example, liquid to solid petroleum fractions varying from gas oils to paraffin waxes and including intermediate fractions such as slack waxes. Such an embodiment of the invention is illustrated by following Table V containing data obtained by oxidation of a slack wax which was refined by filtration through filter clays under the reaction conditions of oxygen input and temperature utilized for the oxidation runs of the preceding tables. As shown in Table V, use of the combination catalyst as embodied herein markedly accelerated the rate of reaction and produced an oxidation product of higher acid to saponification ratio than that obtained with the manganese catalyst per se.

charge have been shown, it should be understood that such concentrations have been utilized for purposes of illustration and not limitation. It should be clear to those skilled in the art that catalyst concentrations other than those specifically set forth herein may be employed with obtainment of the desired results dependent on factors such as the particular hydrocarbon mixture to be oxidized and the reaction conditions employed.

Moreover, although the combination catalysts set forth hereinbefore for illustrative purposes comprised specific ratios of manganese to group IVB metal, it should be clear to those skilled in the art that the invention may be practiced with different ratios of group IVB metal to manganese as long as the ratio employed is such that the rate of oxidations carried out therewith are accelerated as compared to use per se of the manganese component of the combination catalyst. Although it is not intended that the invention be limited to catalysts of defined Table V

| Run No. | Catalyst | Percent catalyst (by weight of charge) | Gram atoms of metal in catalyst per kilogram of charge | Saponification value— Milligrams KOH/g. | | | Final ratio, acid/sap. | Ratio, gram atoms Mn:Group IVB metal in catalyst |
|---|---|---|---|---|---|---|---|---|
| | | | | 4½ hrs. | 6 hrs. | 7½ hrs. | | |
| 14 | Manganese naphthenate (8% Mn) | 1.0 | 0.0146 | 386 | 482 | 554 | 0.60 | |
| 15 | Manganese naphthenate (8% Mn) / Zirconium complex (6% Zr) | 1.5 | 0.0073 / 0.0066 / 0.0139 | 401 | 560 | 650 | 0.64 | 1:0.9 |

As is further evident from the data in the foregoing tables, use of the combination catalyst as embodied herein accelerates the oxidation reaction at both relatively low and relatively high saponification values. In a particular embodiment, the invention is directed to liquid phase oxidation of predominantly paraffinic relatively high molecular weight hydrocarbon mixtures to saponification values of at least 400 to produce oxidized mixtures containing a substantial amount of polyfunctional materials including crystalline dibasic acids. In illustration thereof, the invention may be carried out with respect to the oxidation reaction in accordance with the process described in U. S. Patent No. 2,486,454, the disclosure of which is incorporated herein by reference, relating to partial oxidation of predominantly paraffinic hydrocarbon mixtures in liquid phase by contacting such a mixture with a free oxygen-containing gas under controlled conditions to cause combination of oxygen with the hydrocarbon mixture at an average rate related to the oxidizing temperature as follows: substantially above 1.5 liters of oxygen per hour per kilogram of hydrocarbons at an oxidizing temperature of 120° C., substantially above 23 liters of oxygen per hour per kilogram of hydrocarbons at an oxidizing temperature of 150° C., and substantially above 135 liters of oxygen per hour per kilogram of hydrocarbons at an oxidizing temperature of 180° C.

With reference to the combination catalyst embodied herein and comprising manganese in combination with a group IVB metal, and in the use thereof in the form of salts, the anion component or components of the salts are desirably such that the combination oxidation catalyst is soluble, at least in amounts suitable for such use, in the hydrocarbon mixture under the oxidation reaction conditions. Hence, combinations embodied for use herein are of manganese salts and group IVB metal salts of relatively high molecular weight organic acids such as fatty acids, naphthenic acids, and others, with specific illustrations of the fatty acids being those of the fatty acid series containing from about eight to about twenty-four carbon atoms and including lauric acid, stearic acid, and others.

Although, in the foregoing examples, specific concentrations of catalysts, based on the weight of hydrocarbon numerical ratio as to weight of the group IVB metal to manganese in the combination catalyst, the ratio of manganese to group IVB metal may be in amounts within the range of one gram atom of manganese to from about 0.1 to about 2.5 gram atoms of the group IVB metal sufficient to provide the synergistic effect as aforedescribed as compared to the use of the manganese salt per se. For most purposes, however, suitable results are provided by use of a ratio of manganese to group IVB metal in the range of one gram atom of manganese to from about 0.25 to about 2 gram atoms of the group IVB metal.

Although the present invention has been described in conjunction with certain preferred embodiments thereof, those skilled in the art will readily recognize that variations and modifications can be made. Such modifications and variations are to be considered to be within the purview of the specification and scope of the appended claims.

We claim:

1. In the liquid phase oxidation of relatively high molecular weight predominantly paraffinic hydrocarbon mixtures with oxygen of a free-oxygen containing gas, the improvement wherein the oxidation reaction is carried out in the presence of an oxidation catalyst consisting essentially of a combination of manganese and a group IVB metal in ratio of one gram atom of manganese to from about 0.1 to about 2.5 gram atoms of the group IVB metal.

2. In the liquid phase oxidation of relatively high molecular weight predominantly paraffinic hydrocarbon mixtures with oxygen of a free-oxygen containing gas, the improvement wherein the oxidation reaction is carried out in the presence of an oxidation catalyst consisting essentially of a combination of a manganese salt of a high molecular weight organic acid and a group IVB metal salt of a high molecular weight organic acid, the ratio of salts being such that there is one gram atom of manganese to from about 0.1 to about 2.5 gram atoms of the group IVB metal.

3. In the liquid phase oxidation of relatively high molecular weight predominantly paraffinic hydrocarbon mixtures with oxygen of a free-oxygen containing gas to produce an acidic, partially oxidized product having a saponification value of at least about 400 and a substantial difference between acid and saponification values, the improvement wherein the oxidation reaction is carried out in the presence of an oxidation catalyst consisting essentially of a combination of manganese and a group IVB metal in ratio of one gram atom of manganese to from about 0.1 to about 2.5 gram atoms of the group IVB metal.

4. The improvement as defined in claim 1 except that the said ratio is one gram atom of manganese to from about 0.25 to 2 gram atoms of group IVB metal.

5. The improvement as defined in claim 2 except that the said ratio is one gram atom of manganese to from about 0.25 to 2 gram atoms of group IVB metal.

6. The improvement as defined in claim 1 wherein the group IVB metal is a member of the group consisting of titanium, zirconium, hafnium and thorium.

7. The improvement as defined in claim 1 wherein the group IVB metal is zirconium.

References Cited in the file of this patent

UNITED STATES PATENTS

| | | |
|---|---|---|
| 2,267,753 | Ruthardt | Dec. 30, 1941 |
| 2,410,642 | Farkas et al. | Nov. 5, 1946 |
| 2,486,454 | Zellner | Nov. 1, 1949 |
| 2,657,182 | Katz | Oct. 27, 1953 |
| 2,682,553 | Kirk et al. | June 29, 1954 |
| 2,697,730 | Mecorney et al. | Dec. 21, 1954 |
| 2,704,294 | Morgan | Mar. 15, 1955 |
| 2,739,132 | Riedl | Mar. 20, 1956 |